United States Patent

[11] 3,589,338

| [72] | Inventor | David D. Lovitz |
| | | Short Hills, N.J. |
| [21] | Appl. No. | 852,325 |
| [22] | Filed | Aug. 22, 1969 |
| [45] | Patented | June 29, 1971 |
| [73] | Assignee | Sternco Industries, Inc. |
| | | Harrison, N.J. |

[54] HOLDER FOR TUBE AND BOTTLE FEEDERS FOR PETS
4 Claims, 8 Drawing Figs.

[52] U.S. Cl. .................................................. 119/51,
119/72.5, 119/77, 248/108, 248/302, 248/311
[51] Int. Cl. .................................................. A01k 9/00,
A01k 39/00
[50] Field of Search .................................. 119/18, 51,
72, 72.5, 77; 248/302, 304, 311, 322, 315, 107,
108, 103

[56] References Cited
UNITED STATES PATENTS

| 1,174,766 | 3/1916 | Sheuplein | 119/72.5 |
| 2,279,442 | 4/1942 | Burns et al. | 248/311 |
| 2,653,569 | 9/1953 | Forester | 119/18 |
| 3,049,093 | 8/1962 | Oliver | 119/18 |
| 3,167,287 | 1/1965 | Collins | 248/108 |
| 3,251,342 | 5/1966 | Kay | 119/18 |
| 3,511,461 | 5/1970 | Clark | 248/311 X |

Primary Examiner—Aldrich F. Medbery
Attorney—Emanuel R. Posnack

ABSTRACT: A holder for bottle and tube pet feeders which have a bottom feed pipe and which are adapted for suspension in an inverted position within a pet housing. A wire bracket comprising two parallel upright sections with top hooks supports two forwardly positioned vertically aligned loops, the upper and larger loop being adapted for engagement with the body of the bottle or tube feeder, the lower loop being adapted for underlying supporting engagement with the feeder and in embracing engagement with the feed pipe, whereby the feeder and feed pipe are maintained against displacement.

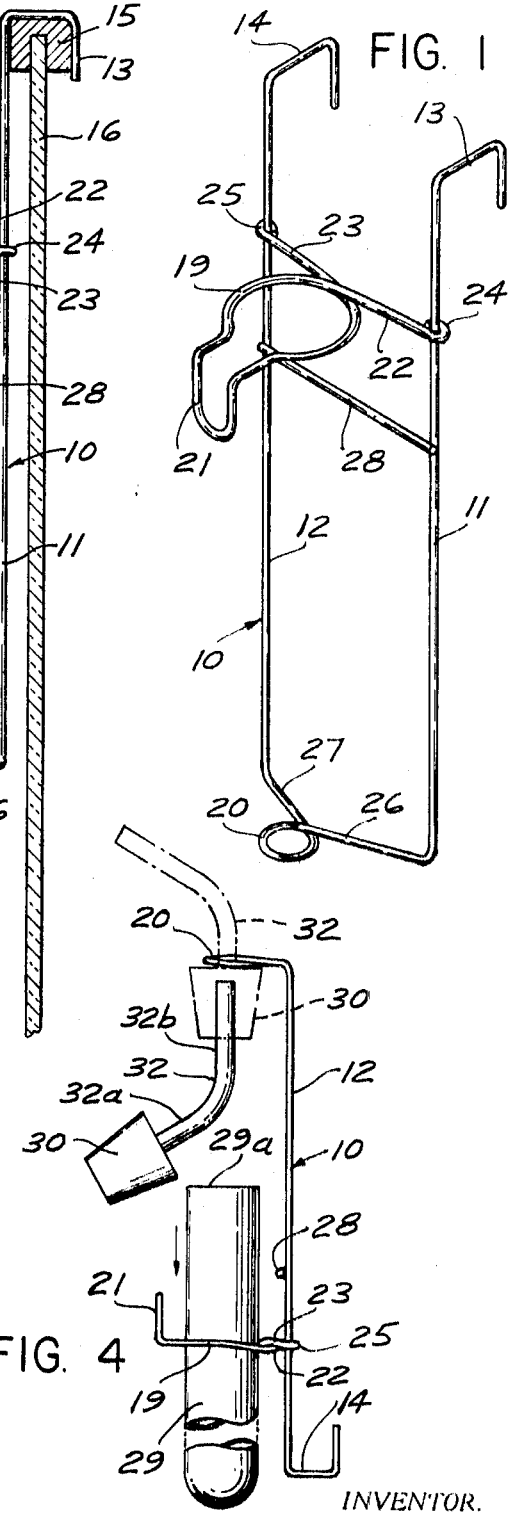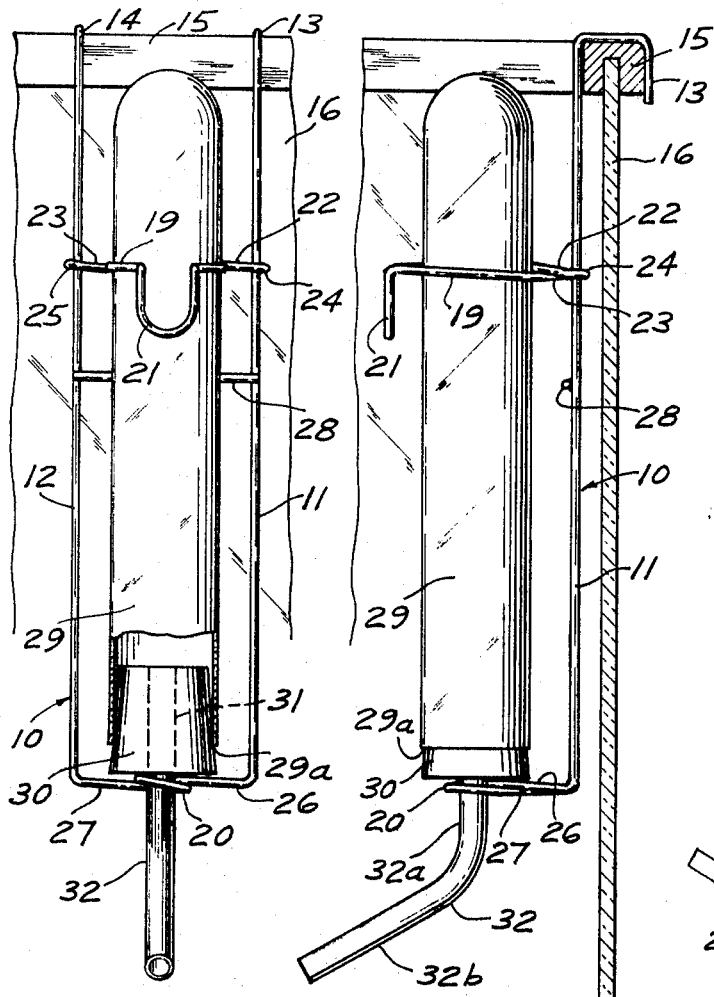

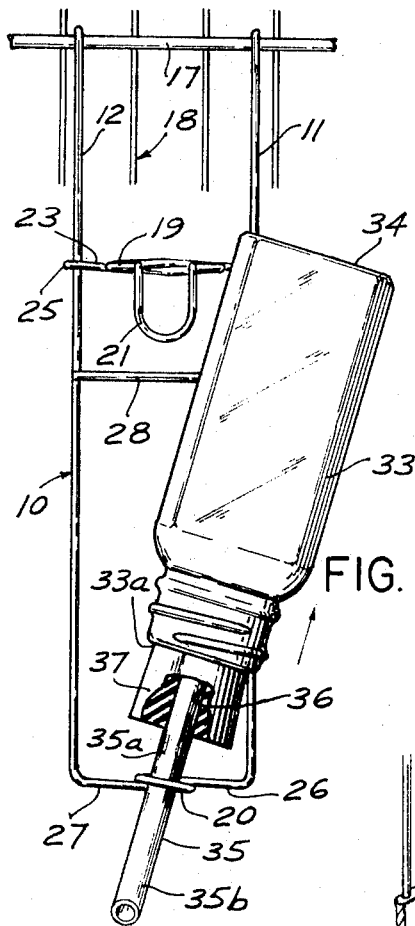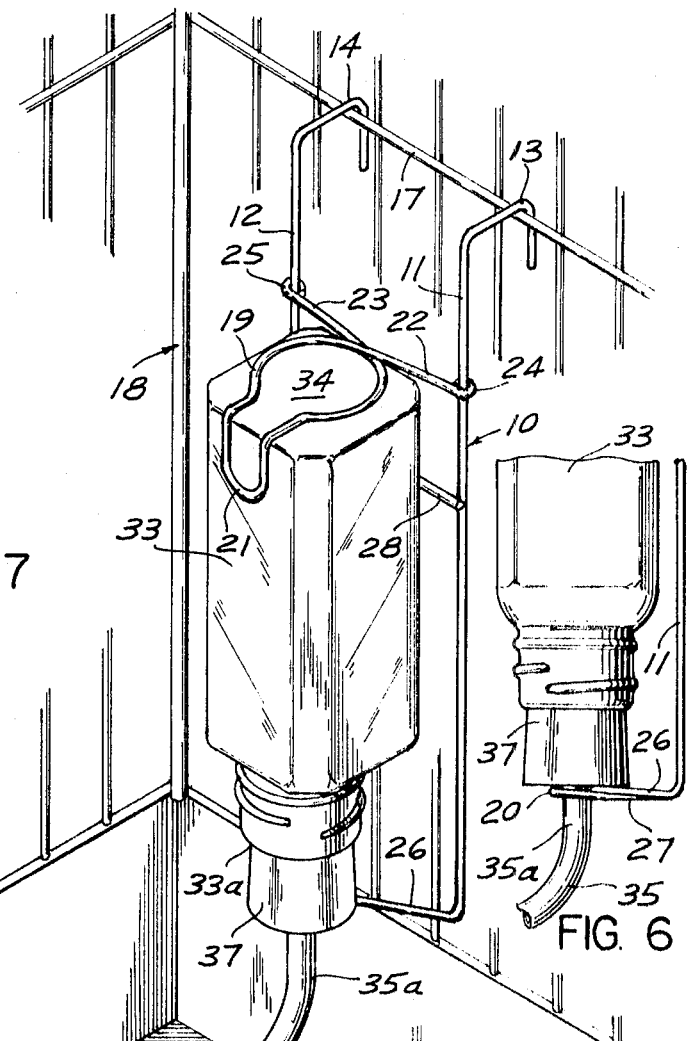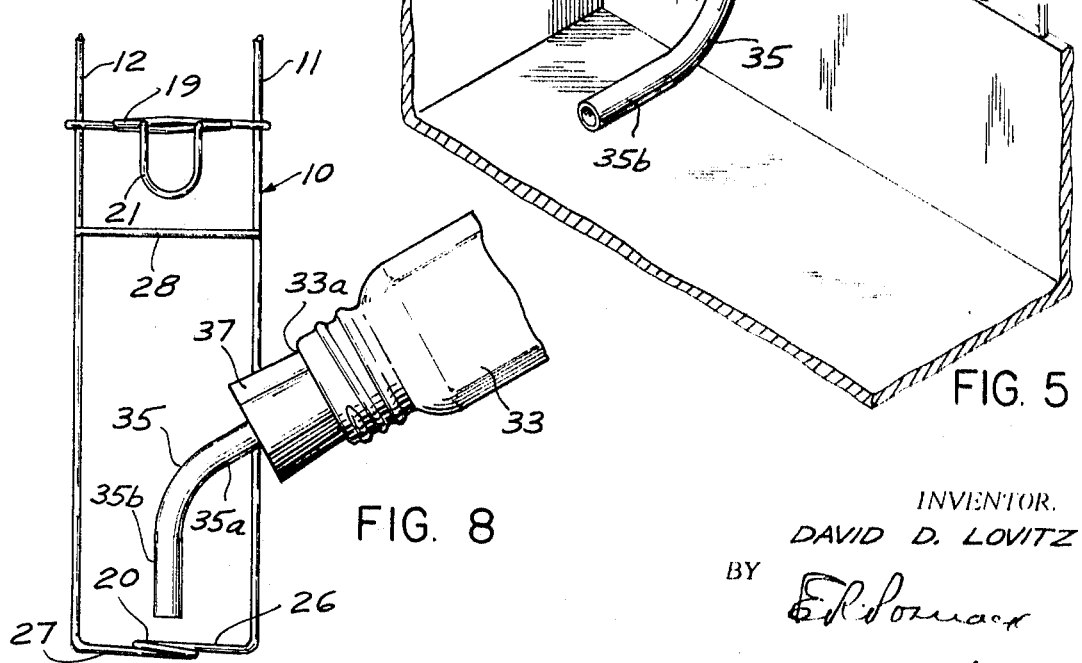

3,589,338

1

HOLDER FOR TUBE AND BOTTLE FEEDERS FOR PETS

FIELD OF THE INVENTION

This invention relates to holders for animal pet feeders, and is particularly directed to bottle and tube feeders provided with a bottom feed pipe and being adapted for suspension in an inverted position within a pet housing, such as a terrarium or cage.

BACKGROUND OF THE INVENTION

The Known Art

Conventional holders of the above-described category, especially those used for feeding hamsters, guinea pigs, mice, gerbies and the like, are generally adapted for use with a particular type of liquid or granular food container or feeder—either a bottle or a test tubelike feeder—the feeder having a stopper in its mouth and a bent feed pipe a portion of which extends down through an axial passageway in the stopper. Such holders are in effect brackets supported by a wall of the housing and having clasping means proportioned for securing a selected type and size of feeder in an operatively inverted position, different brackets being required for bottle and test tube feeders. With such conventional feeder holders there is the ever-present danger that the relatively fragile glass feed pipe will be shifted by the animal while drawing food from the pipe, thereby not only displacing the pipe from its optimum feeding position or withdrawing it from the stopper, but possibly also breaking the pipe. Another shortcoming of known devices of this category is the difficulty of attaching the feeder to the holder and removing it therefrom.

Objectives of the Invention

It is an objective of this invention to provide a holder of the said category that will effectively serve its intended holding function without any of the aforesaid disadvantages. More specifically, among the objects of this invention are the provision of a holder (1) adapted for selective use with both test tube and bottle type of feeders, (2) provided with means for firmly supporting both the body of the feeder and the feed tube against displacement, (3) adapted for ready attachment of the feeder to the holder and for ready detachment therefrom, and (4) of simple and low-cost construction.

Other objects, features and advantages will appear from the drawings and the description hereinafter given.

SUMMARY OF THE INVENTION

In essence this invention comprises a bracket adapted for removable suspension from the wall of a housing for a pet, and two spaced loops supported by and positioned forwardly of said bracket and in vertical alignment, the upper of said loops being the larger of the two and proportioned for holding engagement with the body of the food container or feeder, the lower loop being proportioned for underlying supporting engagement with the feeder and slidable embracing engagement with the feed pipe communicating with the interior of the feeder and extending therebelow to a suitable feeding position.

In the preferred embodiment the said holder is made of wire, the said bracket comprising two substantially parallel upright sections with rearwardly extending hooked tops for suspension engagement with an upper horizontal portion of the housing, such as the top rim of a terrarium or a horizontal bar or wire of a cage. The upper loop is formed with two rearwardly and oppositely extending arms attached to the said respective upright wire sections; and the lower loop is similarly formed with rearwardly and oppositely extending arms joined to the bottom portions of said respective upright sections. Each of said loops is disposed in a horizontal plane, the upper one having its front portion bent downwardly to form a front retaining lip.

2

When used with a test tube type of feeder, the body of the inverted tube extends through the upper loop, the bottom stopper in the mouth of the tube resting upon the lower loop and the vertical portion of the bent feed pipe extending therethrough, whereby both the tube and the feed pipe are held against forward and rearward as well as lateral displacement. When used with a bottle type of feeder, the upper loop overlies and engages the base of the inverted bottle with said downwardly bent retaining lip engaging the upper front portion of the inverted bottle, the bottom stopper, as with the said test tube type of feeder, resting upon the lower loop and the feed pipe extending therethrough, whereby the bottle and its feed pipe are held against displacement.

DESCRIPTIONS OF THE DRAWINGS

FIG. 1 is a perspective view of a holder according to this invention.

FIG. 2 is a front view of the holder showing it supporting a test tube type of feeder and operatively suspended from the rim of a terrarium, a fragment of the tube being removed for clarity.

FIG. 3 is a side view of FIG. 2.

FIG. 4 is a side view of the said holder and tube feeder shown in inverted position after detachment from the terrarium, the assembly of stopper and feed pipe being shown in the process of being removed from the holder, the dot-dash lines representing a partially disassembled position of the stopper and feed pipe.

FIG. 5 is a perspective view of the holder supporting a bottle type of feeder shown operatively in place disposed within a cage.

FIG. 6 is a fragmentary side view of FIG. 5.

FIG. 7 is a front view of the assembly of FIG. 5 showing the bottle in a laterally tilted position and slightly raised, in the process of removal from the holder, a fragment of the bottle being shown.

FIG. 8 is a fragmentary front view showing the bottle member upon detachment from the holder.

DESCRIPTION OF PREFERRED EMBODIMENT

In the particular embodiment illustrated, the bracket 10, comprising the two parallel upright wire sections 11 and 12, have the two top hooks 13 and 14, respectively, these being bent rearwardly and downwardly for hooked suspension from the top rim 15 of a terrarium 16 (FIGS. 2 and 3) or the horizontal wire 17 of a cage 18 (FIG. 5). The said bracket 10 supports between the sections 11 and 12 thereof the two vertically aligned loops 19 and 20, the upper loop 19 being larger than the lower loop 20, said upper loop 19 having its front portion bent downwardly to form the front lip or upper retainer 21. Each of said loops is disposed in a horizontal plane and positioned forwardly of said upright sections 11 and 12. Loop 19 is formed from a single wire, the rearwardly and oppositely extending arms 22 and 23 thereof being connected to and supported by said respective wire upright sections 11 and 12. It is preferred, though not required, that the respective curled terminals 24 and 25 of said arms be in firm frictional slidable engagement with the said respective upright sections 11 and 12 for vertical adjustment. Loop 20 is preferably integral with said upright sections 11 and 12, the oppositely extending arms 26 and 27 of said loops joining the bottoms of said respective upright sections 11 and 12. The horizontal bar 28 is for structural rigidity.

FIGS. 1 to 3 show the application of this device to the test tube type of feeder 29 having in the mouth 29a thereof the stopper 30 with the axial passageway 31 through which extends the feed pipe 32 comprising the vertical section 32a and the angularly bent section 32b. The holder and feeder assembly is suspended in inverted position from the rim 15 as illustrated, section 32b of the feed pipe 32 extending forwardly for convenient feeding. The body of the feeder 29 is embracingly engaged by the upper loop 19, the stopper 30 is supported by the lower loop 20 which also is in enveloping engagement with the upper vertical section 32a of the feed pipe 32. Thus the said two loops 19 and 20 coact to securely hold the tube 29 proper and the feed pipe 32 in feeding position and to maintain them against displacement. One way to disengage the feeder is to remove the holder and feeder from the terrarium, invert the combination to the position shown in FIG. 4, detach the stopper and feed pipe assembly from the tube 29 and slide the tube outwardly through loop 19, and then slip the feed pipe 32 out of the lower loop 20, as illustrated.

FIGS. 5 to 8 illustrate the use of this device with the bottle type of feeder 33. The assembly of holder and feeder are suspended from the support 17 of the cage 18, the upper loop 19 overlying and engaging the base 34 of the bottle 33 while the said retaining lip 21 engages the front of said bottle, the upper vertical section 35a of the feed pipe 35 extending through the axial passageway 36 of the bottle's stopper 37 in the mouth 33a of said bottle 33, said stopper resting upon the said lower loop 20. Both the bottle 33 and the feed pipe 35 are thus operatively supported by said loops and held against displacement. To disassemble the holder and feeder, the latter may be slipped laterally out of engagement with the upper loop 19, as illustrated in FIG. 7, and then lifted upwardly until the feed pipe is out of engagement with the lower loop 20, as shown.

In the above description, the invention has been disclosed merely by way of example and in preferred manner; but obviously many variations and modifications may be made therein. It is to be understood, therefore, that the invention is not limited to any particular form of manner of practicing same.

I claim:

1. A holder for selectively supporting inverted bottle pet feeders and inverted tube pet feeders which have a bottom feed pipe extending down through the mouth of the feeder, comprising supporting means having a bracket and two spaced loops supported in vertical alignment by said bracket, the upper of said loops being the larger of the two and being proportioned for holding engagement with the body of a feeder operatively associated with said holder, the lower of said loops being proportioned for slidable embracing engagement with the feed pipe of said feeder, whereby said feed pipe is held against lateral displacement, said lower loop being positioned for underlying supporting engagement with the operatively supported feeder, the upper of said loops lying in a substantially horizontal plane and being proportioned for overlying engagement with the base of a selected inverted bottle feeder and for encirclement around the body of a selected tube pet feeder.

2. A holder according to claim 1, said bracket having hooked means at the upper portion thereof for operative suspension engagement with a suitable support, said loops being disposed forwardly of said bracket, said upper loop having at the forward portion thereof a downwardly extending retaining lip proportioned and positioned for engagement with the upper front portion of said selected inverted bottle feeder.

3. A holder according to claim 1, said bracket comprising two upright laterally spaced sections, said loops being disposed forwardly of said upright sections, each of said loops having rearwardly and oppositely extending arms in crossing relation connected to said respective upright sections.

4. A holder according to claim 3, said two upright sections and said loops being formed from wire, the said arms of said lower loop being joined to and integral with the bottom ends of said respective two upright sections.